United States Patent Office 3,210,292
Patented Oct. 5, 1965

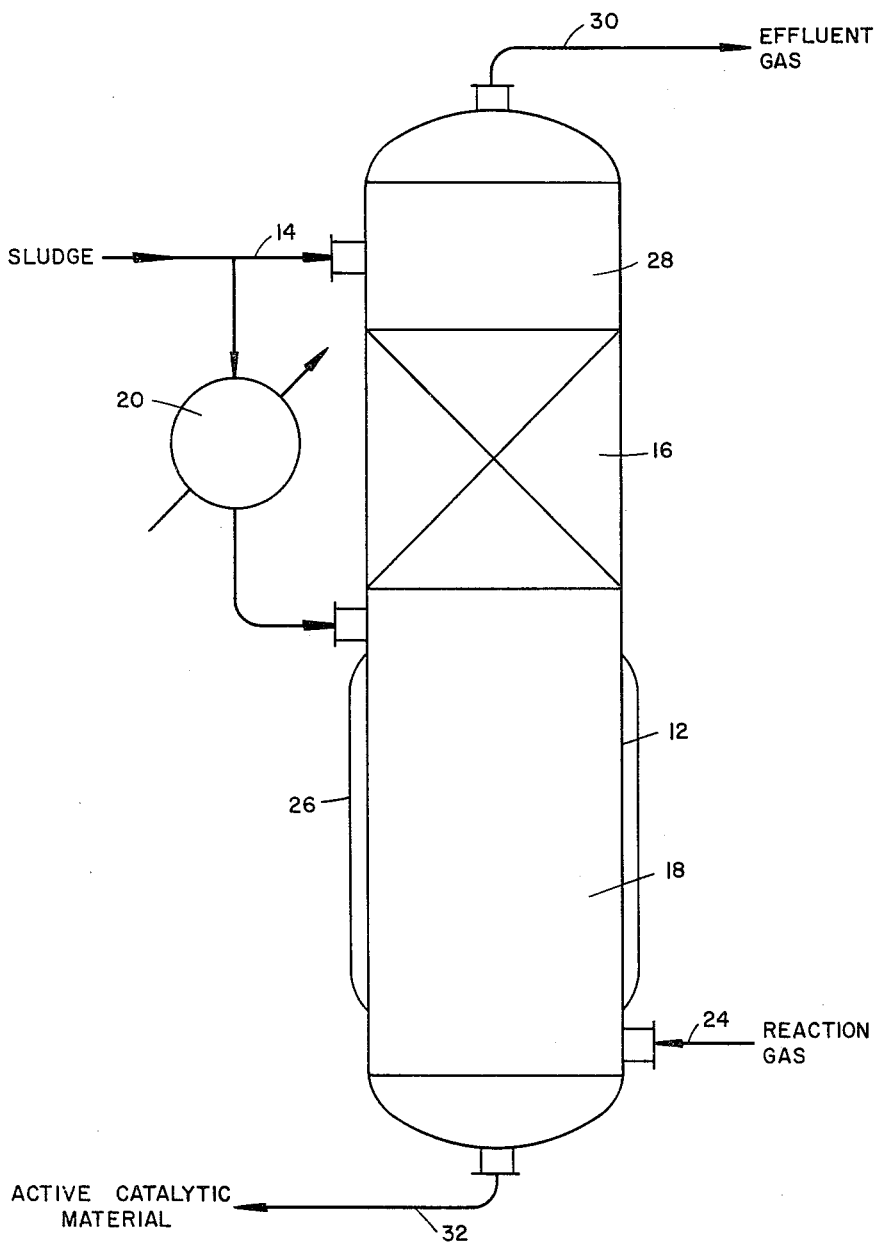

3,210,292
REGENERATION OF AN ALUMINUM HALIDE
CONVERSION CATALYST
Harry D. Evans, Oakland, and Richard J. Schoofs, Lafayette, Calif., assignors to Shell Oil Company, New York, N.Y., a corporation of Delaware
Filed Nov. 9, 1962, Ser. No. 236,647
7 Claims. (Cl. 252—411)

This invention relates to a new and improved process and apparatus for the recovery of active catalytic material from an aluminum halide-hydrocarbon sludge.

The use of Friedel-Crafts type catalyst such as aluminum halide for the conversion of hydrocarbons either alone or in the presence of such added promoters as hydrogen halide, organic halide etc., is well known. Moreever, it is often desirable to modify the catalytic activity of the aluminum halide by interacting the catalyst with a hydrocarbon to form a light complex. In practically all of these processes, the aluminum halide catalyst is gradually converted to heavy aluminum halide-hydrocarbon sludge. The catalyst apparently forms complex compounds with the hydrocarbons undergoing treatment, and in doing so its catalytic activity is diminished or eliminated. The sludge is an exceedingly complex mixture of highly olefinic, conjugated and cyclic hydrocarbons (the hydrocarbon is sometimes described as a conjunct polymer) formed by a combination of reactions such as polymerization, hydrogen transfer and cyclization. Throughout this specification and claims, the terms "aluminum halide-hydrocarbon sludge," "aluminum halide sludge" and "sludge" are all intended to designate the reaction product of an aluminum halide catalyst with a hydrocarbon or hydrocarbon mixture in which the activity of the catalyst is substantially diminished or eliminated.

In present commercial processes, the sludge is discarded after dilution with water to render it innocuous. Of course, the catalyst lost in the sludge and the cost of disposing of the sludge adds materially to the cost of such processes. In many cases, these high costs have hindered the commerical exploitation of Friedel-Crafts catalyst and of processes utilizing these catalyst.

Many methods have been suggested for the recovery of active catalytic material from aluminum halide sludge. Suggested methods include distillation, coking, destructive hydrogenation of the hydrocarbon complex, decomposition of the aluminum halide to aluminum oxide and hydrogen halide, etc. One of the more attractive processes is the hydrogenation of the hydrocarbon complex.

In the past, the sludge has been hydrogenated in a reactor such as a stirred reactor. There are certain operational disadvantages associated with the hydrogenation of sludge when the active catalyst material is recovered as substantially a liquid. For example, there are appreciable amounts of entrained and dissolved hydrocarbon in the sludge rejected from the conversion process. This free hydrocarbon is, to a large extent, a product of the conversion process. The hydrocracking of these hydrocarbons during catalyst reactivation degrades the value of the hydrocarbon from product such as isomerizate to light hydrocarbon gases such as methane and ethane which generally can be used only as refinery fuel.

Another disadvantage in using these reactors is that during the sludge hydrogenation reaction, certain amounts of catalyst salts are vaporized and pass from the reactor in the effluent gas. These salts condense in the piping in such critical locations as control valves and the like. The vaporized salts not only cause operational difficulties and increase maintenance cost, but also result in the loss of valuable catalyst.

It has now been found in accordance with the present invention that when the hydrogenation reactor contains a stripping-absorption zone as well as the reaction zone, vaporized salts in the effluent gas are absorbed by the reject sludge from a conversion process and the entrained and dissolved hydrocarbon in the reject sludge is stripped by the effluent gas before possible degradation (cracking) in the reaction zone of the reactor. Additional advantages will become apparent as the description of the invention proceeds. The drawing illustrates a preferred embodiment of the apparatus and process of the invention.

The hydrogenation process is suitable for the recovery of active catalytic materials from aluminum halide sludges produced from any process utilizing a Friedel-Crafts type catalyst in the presence of a hydrocarbon. It is particularly applicable to complexes formed in the reaction between aluminum halide such as aluminum chloride or aluminum bromide and hydrocarbons. For example, it is applicable to sludges formed in Friedel-Crafts cracking of hydrocarbons such as naphthas, kerosenes, gas oils, etc., to hydrocarbons of lower molecular weight; in Friedel-Crafts polymerization of olefins to form higher molecular weight hydrocarbons in the gasoline or lubricating oil boiling ranges; in Friedel-Crafts alakylation of isoparaffinic or aromatic hydrocarbons with olefinic hydrocarbons throughout a wide boiling range, e.g., for the manufacture of ethylbenzene by alkylation of benzene with ethylene; in the Friedel-Crafts isomerization of wax and in the treatment of lubricating oils with aluminum chloride.

The apparatus and the process are broadly applicable to the recovery of the active catalytic material as a liquid from an aluminum halide-hydrocarbon sludge. For example, the apparatus and process are suitable for restoring activity to the catalyst in the form of a mobile, fluid, light aluminum halide-hydrocarbon complex. Or, the process and apparatus can be used for the recovery of the aluminum halide as such, substantially or entirely free of the hydrocarbon material. In one particularly attractive embodiment of the invention, the aluminum halide catalyst is efficiently recovered from the sludge when hydrogenated in the presence of antimony trihalide and recovered as a liquid in admixture with the antimony trihalide.

In order to set forth more appropriately the nature of the invention, without however intending to limit the scope thereof, it will be described in detail in relation to a hydrogenation reactor wherein the stripping-absorption zone and the reaction zone are contained in an unitary vessel.

Referring now to the drawing: an aluminum halide-hydrocarbon sludge from a conversion process and, if desired, antimony trihalide, enter the hydrogenation reactor 12 through line 14. The sludge passes countercurrently to' the effluent gas stream through the stripping-absorption zone 16 to strip free hydrocarbon from the sludge and absorb vaporous salts from the effluent gas, and then the sludge passes into the reaction zone 18. If desired, a portion of the sludge bypasses the stripping-absorption zone, is heated in heat exchanger 20 and enters reaction zone 18 through by pass line 22. The reaction gas, hydrogen and if desired hydrogen halide, is introduced into the reaction zone 18 through line 24 to convert the sludge to active catalytic material and hydrocarbon. The reaction zone 18 can be surrounded by heat transfer means 26 to control the temperature of the hydrogenation reaction. The effluent gas from the reaction zone, containing hydrogen, hydrogen chloride and some vaporized catalyst salts, passes upwardly through the stripping-absorption zone 16 in which it is scrubbed with the sludge. The scrubbed effluent gas passes through a final disengaging zone 28 and is withdrawn from the hydrogenation reactor through line 30. The active catalyst material is withdrawn from the hydrogenation reactor through line 32 and can be returned to the conversion process.

The hydrogenation reactor is of appropriate design to insure intimate contact between the sludge and the reaction gases. A particularly suitable design is a vertical tower reactor type wherein the ratio of the length of the vessel to the diameter of the vessel is from about 10 to 1 to about 70 to 1. The preferred ratio of length to diameter is about 40 to 1 to about 60 to 1. The vessel can be constructed of any suitable material such as steel, nickel and various alloys or it can be for example a steel vessel lined with nickel.

While it is not necessary in the practice of the invention, it is preferred to pass the liquid aluminum halide-hydrocarbon sludge through the stripping-absorption zone countercurrently to the effluent gas from the reaction zone. This stripping-absorption zone can be contained in an external vessel. However, it is preferred that the stripping absorption zone is an integral part of the hydrogenation reactor vessel. The entrained and dissolved hydrocarbon in the catalyst sludge is effectively stripped from the sludge stream by the effluent gas before possible degradation in the reaction zone of the reactor. The high efficiency of this stripping zone is attributable to the large activity coefficient of the hydrocarbon in the sludge. Moreover, the vaporized salts in the effluent gas are absorbed by the reject sludge. Several other advantages of the stripping-absorption zone are that the zone provides intimate heat transfer between the hot effluent gas and the cold sludge stream and the sludge stream becomes hydrogen saturated.

This multi-functional zone has from about 1 to about 10 theoretical stages, preferably about 1 to about 4 theoretical stages. The zone is usually designed so as to operate at about 50% to about 80% of capacity. The zone generally consists either of fractionating trays such as the disc and donut arrangement or a packed bed of inert particulate solids. In a preferred embodiment, the materials of the bed are chosen so that there is a large free-space to surface area with few liquid holding pockets to accumulate the sludge, metal corrosion products or other contaminants. It is naturally preferred that the materials not be subject to corrosion by the sludge or gaseous streams. Examples of suitable materials are Lessing ring, Raschig rings, packing cones, ceramic balls, spiral rings, cross partition rings, Berl saddles, interlock saddles, and irregularly-shaped materials such as crushed rock. The length to diameter ratio of the zone is from about 2:1 to about 20:1, preferably about 2:1 to about 15:1. The superficial gas velocity is from about 0.01 to about 0.3 feet per second, preferably 0.05 to about 0.2 feet per second.

In one preferred embodiment of the invention, a bypass with a heat exchanger is provided around the stripping-absorption zone. In this manner, it is possible to use a cool sludge stream to scrub more efficiently the effluent gas while bypassing the remainder of the sludge through the heat exchanger, resulting in an overall hotter sludge stream to the reaction zone.

The reaction zone is generally operated substantially liquid full. It is preferred to maintain the liquid level in this reaction zone at about 1 to 3 feet below the stripping-absorption zone. Reaction contact time varies from about 5 minutes to about 10 hours depending upon the type of sludge, reactor design, contacting efficiency, temperature, etc. The preferred contacting periods are from about 5 minutes to about 3 hours. The reaction zone may be agitated by suitable means such as a mixer. However, it is preferred that there is no stirring in order to get the benefit of staging in the reaction zone.

The hydrogenation conditions for converting the sludge to active catalytic material are a temperature range from about 100° C. to about 250° C. and a hydrogen partial pressure from about 200 p.s.i. to about 2500 p.s.i. The preferred hydrogenation conditions are a temperature range from about 150° C. to about 225° C. and a hydrogen partial pressure from about 400 p.s.i. to about 1400 p.s.i.

The hydrogen should be essentially dry and is desirably free from hydrogen sulfide. The hydrogen consumption varies from about 5 standard cubic feet per pound of hydrocarbon in the sludge to about 36 standard cubic feet per pound hydrocarbon in the sludge. It is desirable to use excess hydrogen, i.e., a hydrogen feed rate to the reactor greater than the hydrogen consumption, for example, up to 10 times the hydrogen consumption, in order to maintain high partial pressures over the reactor length. Preferably the hydrogen feed rate of the reactor is about 2 to about 6 times the hydrogen consumption.

It is generally desirable to hydrogenate the sludge in the presence of a hydrogen halide such as hydrogen chloride or hydrogen bromide. When the hydrogenation is done in the presence of antimony trihalide, e.g., antimony trichloride, the hydrogen halide suppresses the decomposition of the antimony trichloride. The amount of hydrogen halide present is suitably from about 2% to about 20% by volume basis total hydrogen plus hydrogen halide. The preferred amount of hydrogen halide is from about 4% to about 12% by volume basis total hydrogen plus hydrogen halide.

In one attractive embodiment of the invention, the reaction zone is surrounded by heat transfer means. The heat evolved in the overall catalyst regeneration can be considered in two parts: endothermic freeing of aluminum chloride from the complex and exothermic hydrocracking of the conjunct polymer. When hydrocracking sludge of low complex aluminum chloride content in the presence of antimony trichloride, the sensible heat required by the antimony trichloride is by far the largest item in the overall heat balance. Accordingly, heat input is provided by reactor jacketing and the reactor temperature is controlled by some heat means such as hot oil, steam or electrical coils. When hydrocracking sludge of high complex aluminum halide content, the exothermic hydrocracking reaction will tend to raise the temperature above the desirable hydrocracking temperature. In this case, the reactor temperature is controlled by using a cooling medium such as oil in the reactor jacket.

We claim as our invention:

1. In a process for recovering active catalytic material from aluminum halide-hydrocarbon sludge wherein sludge is contacted with an excess of hydrogen under hydrogenation conditions to convert the sludge to active catalytic material and hydrocarbon and an effluent gas is obtained containing excess hydrogen and vaporous salts, the improvement which comprises contacting the sludge in a stripping-absorption zone prior to hydrogenation with the effluent gas, thereby stripping free hydrocarbon from the sludge and absorbing vaporous salts from the effluent gas, feeding stripped sludge to the hydrogenation reaction, and separately removing effluent gas containing an increased content of normally liquid hydrocarbon.

2. In a process for recovering active catalytic material from aluminum halide-hydrocarbon sludge in the presence of antimony trihalide wherein the mixture of sludge and antimony trihalide is contacted with an excess of hydrogen at a temperature from about 100° C. to about 250° C. and a hydrogen pressure from about 200 p.s.i. to 2500 p.s.i. to obtain active catalytic material and hydrocarbon, thereby obtaining an effluent gas containing excess hydrogen and vaporous salts, the improvement therein which comprises contacting the mixture of sludge and antimony trihalide in a stripping-absorption zone prior to hydrogenation with the effluent gas, thereby stripping free hydrocarbon from the sludge and absorbing vaporous salts from the effluent gas, feeding stripped sludge to the hydrogenation reaction, and separately removing effluent gas containing an increased content of normally liquid hydrocarbon.

3. The process of claim 2 wherein the antimony trihalide is antimony trichloride and the aluminum halide is aluminum chloride.

4. In a process for recovering active catalytic material from aluminum halide-hydrocarbon sludge in the presence of antimony chloride wherein the mixture of sludge and antimony chloride is contacted with hydrogen and hydrogen chloride at a temperature in the range of from about 100° C. to about 250° C. and at a hydrogen pressure from about 400 p.s.i. to about 1400 p.s.i. to convert the sludge to active catalytic material and on effluent gas containing hydrocarbon, hydrogen halide, hydrogen and vaporous salts is obtained, the improvement therein which comprises contacting the mixture of sludge and antimony chloride in a stripping-absorption zone prior to hydrogenation with the effluent gas from the hydrogenation reaction, thereby stripping free hydrocarbon from the sludge and absorbing vaporous salts from the effluent gas, feeding stripped sludge to the hydrogenation reaction, and separately removing effluent gas containing an increased content of normally liquid hydrocarbon.

5. In a process for recovering active catalytic material from aluminum halide-hydrocarbon sludge wherein sludge is contacted with an excess of hydrogen at a temperature of from about 150° C. to about 225° C. and a hydrogen partial pressure of from about 400 p.s.i. to about 1400 p.s.i. to convert the sludge to active catalytic material and hydrocarbon, and an effluent gas is obtained containing excess hydrogen and salt vapors, the improvement which comprises contacting the sludge in a stripping-absorption zone prior to hydrogenation with the effluent gas, thereby stripping free hydrocarbon from the sludge and absorbing salt vapors from the effluent gas, separately removing from the stripping-absorption zone effluent gas containing an increased content of normally liquid hydrocarbon and stripped sludge, and feeding stripped sludge to the hydrogenation reaction.

6. The process of claim 5 wherein the aluminum halide is selected from the group consisting of aluminum chloride and aluminum bromide.

7. In a process for recovering active catalytic material from aluminum chloride-hydrocarbon sludge wherein sludge is contacted with an excess of hydrogen at a temperature of from about 150° C. to about 225° C. and a hydrogen partial pressure of from about 400 p.s.i. to about 1400 p.s.i. to convert the sludge to active catalytic material and hydrocarbon, and an effluent gas is obtained containing excess hydrogen and salt vapors, the improvement which comprises countercurrently contacting the sludge prior to hydrogenation with the effluent gas in a stripping-absorption zone having from about 1 to 10 theoretical stages, thereby stripping free hydrocarbon from the sludge and absorbing salt vapors from the effluent gas, separately removing from the stripping-absorption zone effluent gas containing an increased content of normally liquid hydrocarbon and stripped sludge, and feeding stripped sludge to the hydrogenation reaction.

References Cited by the Examiner
UNITED STATES PATENTS

| | | | |
|---|---|---|---|
| 2,293,891 | 8/42 | Evering et al. | 252—411 |
| 2,348,408 | 5/44 | Page | 252—411 |
| 2,983,851 | 7/59 | Georgian | 23—288 |
| 2,977,323 | 3/61 | Johnson et al. | 252—415 |
| 2,989,382 | 6/61 | Voorhies | 23—288 |
| 2,999,071 | 9/61 | Frey | 252—415 |

MAURICE A. BRINDISI, *Primary Examiner.*